Figures 1, 2, 3:
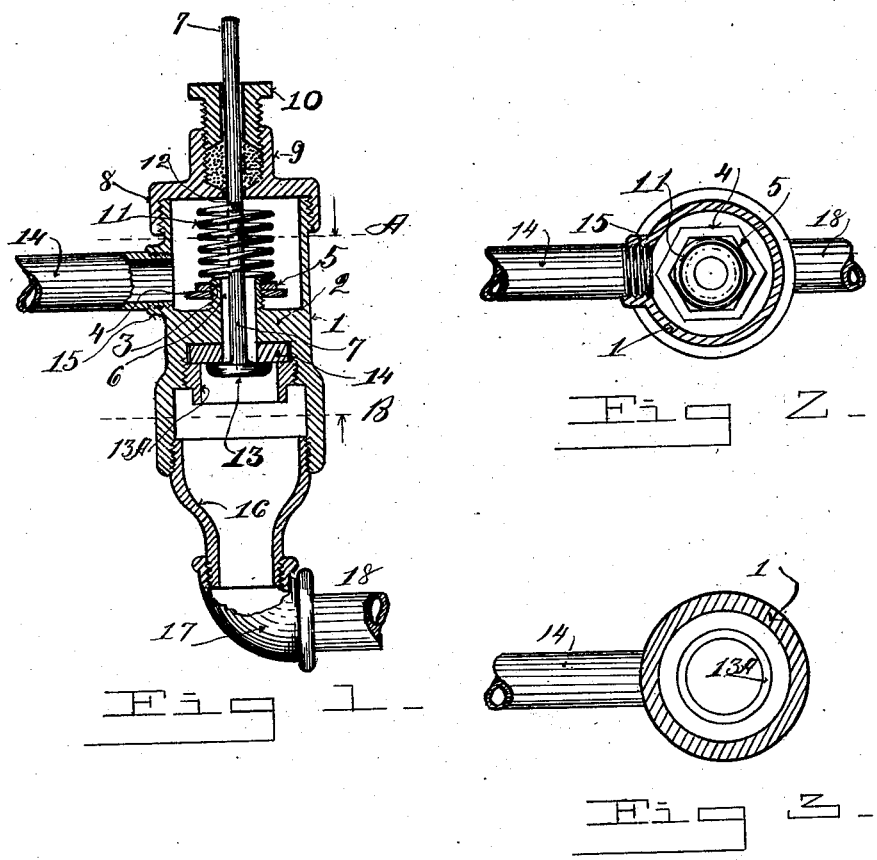

No. 665,035. Patented Jan. 1, 1901.
W. H. SAUVAGE.
VALVE.
(Application filed Mar. 3, 1900.)

(No Model.)

WITNESSES:
Claude A. Dunn.
Clara Irwin.

INVENTOR
William H Sauvage
BY
H. S. Bailey ATTORNEY.

UNITED STATES PATENT OFFICE.

WILLIAM H. SAUVAGE, OF DENVER, COLORADO, ASSIGNOR, BY DIRECT AND MESNE ASSIGNMENTS, TO THE SAUVAGE DUPLEX AIR BRAKE COMPANY, OF SAME PLACE.

VALVE.

SPECIFICATION forming part of Letters Patent No. 665,035, dated January 1, 1901.

Application filed March 3, 1900. Serial No. 7,194. (No model.)

*To all whom it may concern:*

Be it known that I, WILLIAM H. SAUVAGE, a citizen of the United States of America, residing at Denver, in the county of Arapahoe and State of Colorado, have invented certain new and useful Improvements in Valves; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in air-valves for air-brake train-service and for general air and steam use; and the objects of my invention are, first, to provide an improved back-pressure air-valve in which the valve is spring-controlled in one direction of its movement and in which the tension of the spring is adjustable, and, second, to provide an air-valve in which the seat is removable and renewable. I attain these objects by the mechanism illustrated in the accompanying drawings, in which—

Figure 1 is a central sectional elevation of a valve embodying my invention. Fig. 2 is a sectional plan view of Fig. 1 on line A in direction of arrow. Fig. 3 is a sectional plan view of Fig. 1 on line B in direction of arrow.

Similar figures of reference refer to similar parts throughout the several views.

Referring to the drawings, the numeral 1 designates the body of the valve. About midway of its length a diaphragm 2 extends across it, in the center of which a tubular hub 3 is formed, which projects upward a short distance. The outside of this hub is threaded and two nuts 4 and 5 are threaded to it. The hole 6 in the hub extends through the diaphragm 2. A valve-stem 7 extends through the hub and diaphragm and up through a cap 8, that is threaded to the top of the body of the valve. The cap contains a stuffing-box 9 and a gland 10, which is preferably threaded to the inside of the gland. A compression-spring 11 surrounds the valve-stem above the nuts 4 and 5. The lower end of the spring rests on the nut 5 and the upper end is attached to the valve-stem at 12. The tension of the spring is adjusted by raising or lowering the nuts on the hub of the diaphragm. The lower end of the valve-rod is provided with a disk-shaped valve 13, which rests against a removable seat 14, which may be composed of any suitable material, such as leather, rubber, or something of that kind. The valve-seat is held against the under side of the diaphragm by a tubular nut $13^A$, which is threaded to the inside of the body of the valve. A pipe 14 is threaded to a boss 15 just above the diaphragm and forms the air-entrance to the valve, which is forced to the valve by air-pumps. A reducing-nipple 16 is threaded to the lower end of the valve and an elbow 17 is threaded to the end of the reducing-nipple. From the elbow a pipe 18 leads to a reservoir, which with the air-pumps and train system are not shown, as they do not form any part of my invention.

Having described my invention, what I claim as new, and desire to secure by Letters Patent, is—

1. In an air-valve, the combination of a valve-body, a diaphragm in said body, a hub portion on said diaphragm, nuts threaded to said hub portion, a hole through said hub portion, a valve extending through said hub and diaphragm and arranged to bear on the under side of said diaphragm and an expansive spring resting at one end on said nuts and secured at its opposite end to said valve-stem and arranged to resiliently hold said valve against its seat, substantially as described.

2. In an air-valve, the combination with the valve-body having a diaphragm, a threaded hub on said diaphragm, nuts threaded to said hub, an air-hole through said hub and diaphragm, a cap containing a suitable gland and stuffing-box on said valve-body, a valve-stem extending through said diaphragm and cap, a removable valve-seat on the under side of said diaphragm, a hollow nut threaded to said valve-body and arranged to hold said
5 removable valve-seat against said diaphragm, a valve on the lower end of said valve-stem arranged to seat against said removable valve-seat, an inlet above said diaphragm and an air-outlet below said diaphragm, substantially as described.

In testimony whereof I affix my signature in presence of two witnesses.

WILLIAM H. SAUVAGE.

Witnesses:
CLAUDE A. DUNN,
CLARA IRWIN.